March 21, 1933.  G. FLINTERMANN  1,902,632
ADJUSTABLY SUPPORTED SEAT
Filed April 25, 1931  2 Sheets-Sheet 1

INVENTOR
Gerhard Flintermann
BY Pennie, Davis, Marvin & Edmonds
HIS ATTORNEYS

March 21, 1933. G. FLINTERMANN 1,902,632
ADJUSTABLY SUPPORTED SEAT
Filed April 25, 1931 2 Sheets-Sheet 2
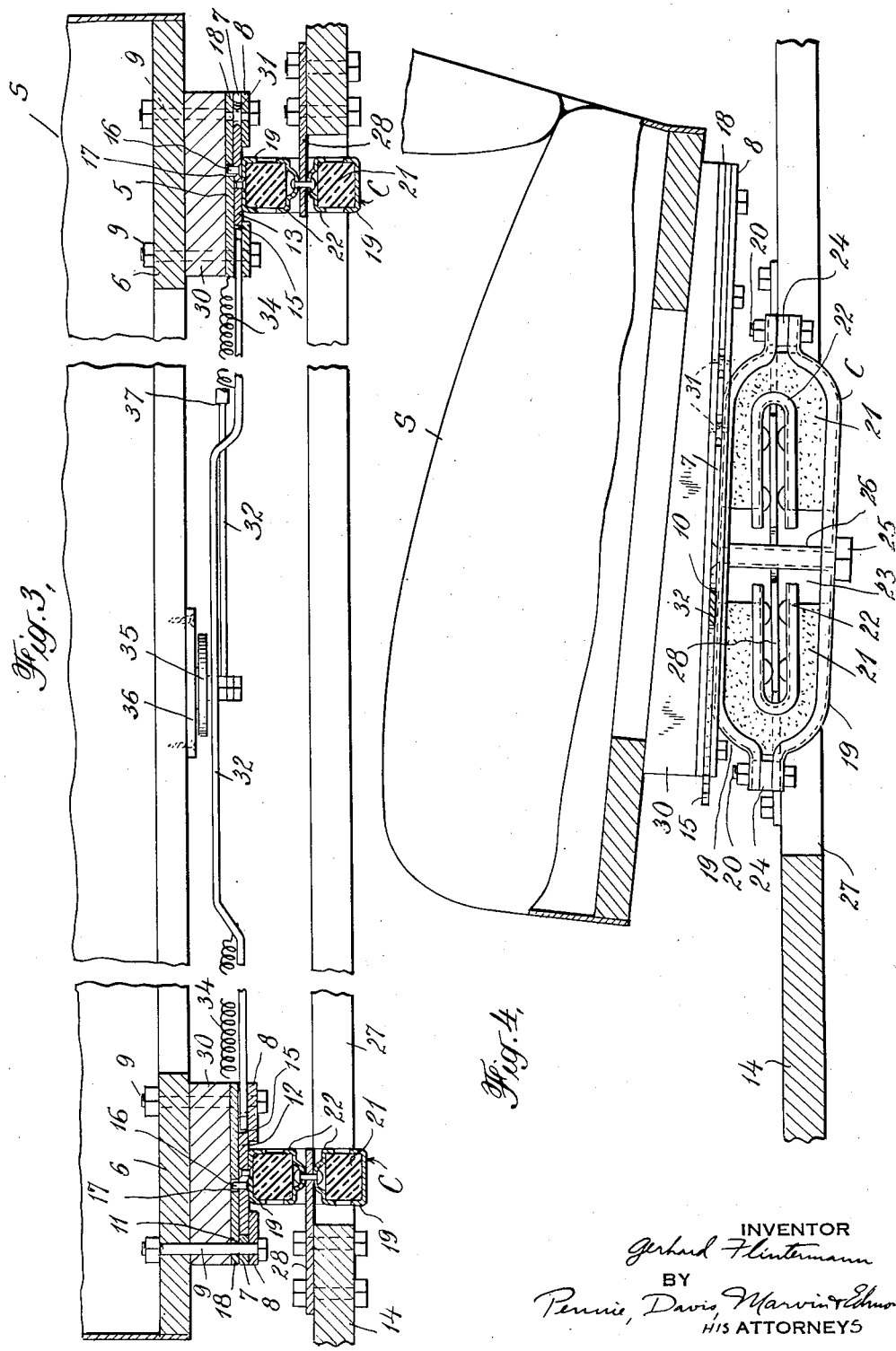

Patented Mar. 21, 1933

1,902,632

UNITED STATES PATENT OFFICE

GERHARD FLINTERMANN, OF WEST ORANGE, NEW JERSEY

ADJUSTABLY SUPPORTED SEAT

Application filed April 25, 1931. Serial No. 532,827.

This invention relates to seats and more particularly concerns supporting and adjusting means for seats which are arranged for adjustable movement relative to a fixed support.

Apparatus embodying the present invention comprises generally a seat mounted for forward and rearward sliding movement on a fixed support. Seats of this type are used extensively in vehicles and in other installations where a change in the seat position is desirable to alter the leg room provided or to change the position of the seat occupant or other reasons. The seat construction of the invention is of the type in which releasable means are provided for at times preventing relative movement between the seat and its support, such means being released by the seat occupant when a change in the seat position is desired, and the seat being then moved manually by the occupant and then locked in its new position. In accordance with the invention, the sliding support for the seat comprises a pair of spaced substantially parallel slides and guides, or equivalent means, extending forwardly and rearwardly of the seat, and respectively disposed adjacent opposite sides of the seat. The seat is almost invariably moved by the person who sits adjacent one side thereof and since the power thus applied to the seat to move it is applied at a point more closely adjacent one sliding support than the other, the side of the seat remote from that occupied by the operator thereof tends to lag or drag behind the operator's side with a resultant tendency toward twisting of the seat and binding or jamming and locking of the slide mechanism.

With the above and other considerations in mind, it is proposed in accordance with the present invention to provide improved sliding supporting means for seats of the type described, which means prevent undesirable binding of the seat when it is moved by a non-centrally applied force. It is a further object of the invention to provide a seat of this type embodying cushioning elements interposed in supporting relationship between the seat and its support, these elements acting not only to absorb shocks and so improve the riding qualities of the seat, but also to permit a limited relative movement between the spaced slide mechanism elements either on the seat or on the support whereby the binding of the slide mechanism upon movement of the seat is further reduced and the jamming of this mechanism is effectively prevented. The invention also contemplates the provision of improved and simplified releasable locking means for at times retaining the seat against movement along its slide mechanism.

In general, the above and other objects of the invention are carried out by interposing two substantially parallel spaced slidably cooperating pairs of elements in supporting and connecting relationship between the seat and its support and by providing means for reducing the friction between one of such pairs of cooperating elements to a value less than the friction between the other of such pairs of elements. The pair of interengaging elements adjacent the side of the seat remote from that at which the vehicle operator sits, is preferably arranged to have the least friction whereby these elements may be readily moved relative to each other by the comparatively small proportion of the propelling force delivered to the side of the seat remote from the operator, and in this manner, the binding of the sliding mechanism is substantially eliminated. In accordance with one embodiment of the invention, rotary anti-friction elements are employed to thus reduce the friction of the slide mechanism at one side of the seat.

In a preferred form of the invention, one set of spaced elements, either those connected to the seat or those connected to the support, are connected to such members by resilient means arranged to permit a limited relative movement of these slide elements in the plane of movement of the seat as the seat is moved. This relative movability of the slide elements permits them to adapt themselves to a slightly twisted position of the seat and so prevents the undue binding or jamming of the sliding mechanism due to unsymmetrically applied forces on the seat during the movement thereof.

Various other objects, advantages and characteristic features of the invention will be pointed out or will become apparent as the description thereof progresses.

In describing the invention in detail, reference will be made to the accompanying drawings in which one embodiment of the invention has been illustrated. In the drawings:

Fig. 3 is a sectional view taken along the line 3—3 of Fig. 1 and viewed in the direction of the arrows; and Fig. 4 is a sectional view taken along the line 4—4 of Fig. 1 and viewed in the direction of the arrows.

Figure 1:
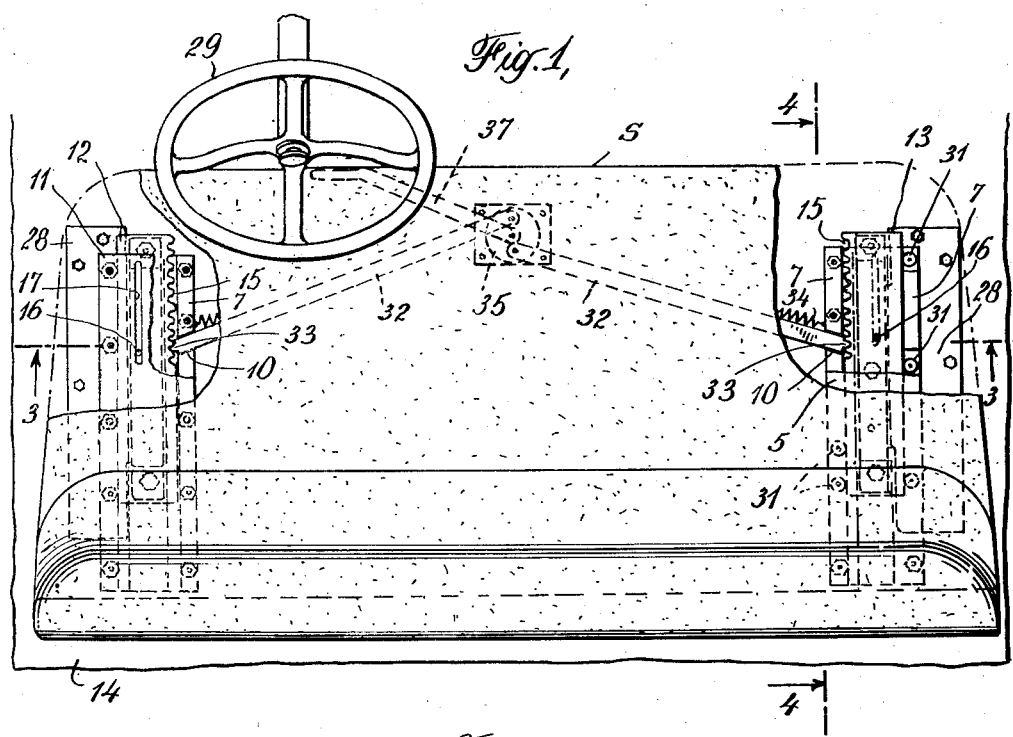
Figure 1 is a top plan view of a seat construction embodying the present invention, certain of the parts being broken away to show the arrangement of the sliding supports.

Referring to the drawings, the seat proper, indicated at S in Fig. 4, is carried by a frame 6 which may be formed of wood or any other suitable material. In the disclosed embodiment of the invention, the seat S is mounted for sliding movement on a base structure 14 which may comprise the usual floor structure of an automobile.

Figure 2:
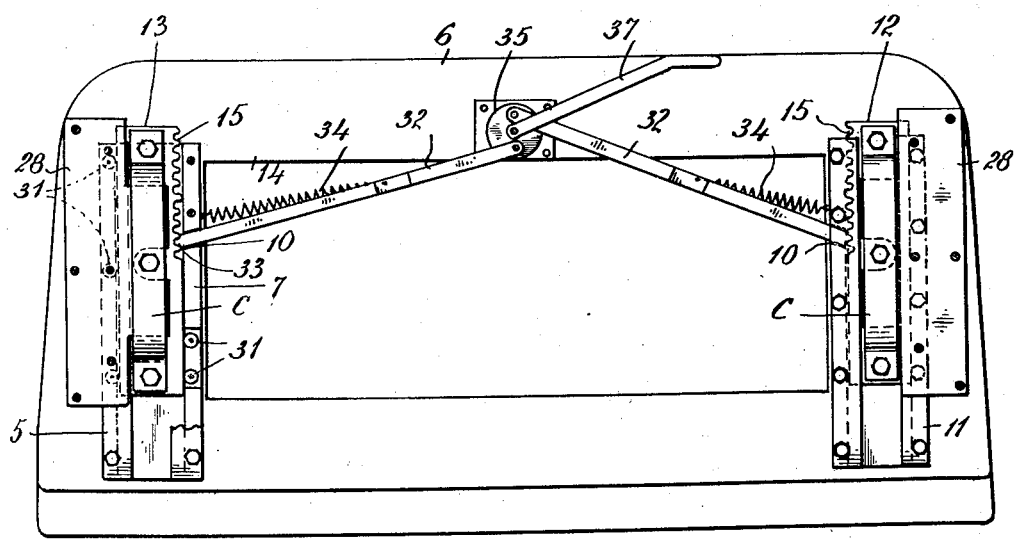
Fig. 2 is a bottom plan view of the seat construction shown in Fig. 1.

The seat S is mounted on a pair of interengaging slides or guides or equivalent means which are located respectively adjacent the two sides of the seat, as shown in Figs. 1, 2 and 3. It should be understood that either the slides or the guides may be attached to the seat, the other element being attached to the fixed support. As shown, a pair of parallel guides 5 and 11 are fixed to the undersurface of the seat frame 6, a tapered block 30 being disposed between each guide and the seat frame proper. Each guide comprises a plate 18 having a pair of parallel spacers 7 and a pair of spaced parallel retaining plates 8 fixed to the undersurface thereof in the order named by means of the bolts 9 or other suitable means. It should be understood that the plates 18, spacers 7 and retaining plates 8 may be formed integral, if desired. The inner spacer 7 of each of the guides 5 and 11 is provided with an annularly disposed opening 10 for the reception of the seat locking bars, as hereinafter more fully explained.

A slide 12 is disposed in the guide 11 and a similar slide 13 is disposed in the guide 5. Each of the slides 12 and 13 comprises a flat plate having a row of projections, such as the teeth 15, along its inner edge near the forward end of the seat, as shown in Figs. 1 and 2, and each slide is slidably carried between the spacers 7 of its corresponding guide and retained in position by the plates 8. A pin or stud 16 is fixed to each of the slides 12 and 13 and projects upwardly therefrom into a slot 17 in the corresponding guide plate 18, the pin acting to limit the movement of the seat as the end of the slot comes into engagement therewith.

The slides 12 and 13 are preferably respectively connected to the fixed support 14 through resilient means such as the cushioning elements C. The cushioning elements may take various forms but are preferably designed to permit a limited degree of relative movement between the two slides 12 and 13 in the plane of movement of the seat S. In the disclosed embodiment, each cushioning element comprises a pair of channel-shaped metal members 19 attached together at their ends by means of the bolts 20 to form an annular ring. An annular soft rubber core 21 is seated within the annular ring thus formed between the side walls of the channel-shaped members 19 and an annular sheet metal core 22 having a grooved outer surface is mounted within the opening in the rubber core. The rubber core 21 may be conveniently formed of two U-shaped members having their ends spaced apart, as shown in Fig. 4. Suitable spacing members such as the metal blocks 24 are disposed between the end portions of the outer channel-shaped members 19.

The upper channel member 19 of each cushioning element C is fixed to the undersurface of one of the slides 12 or 13 by suitable means such as rivets and the central bolt 25. The bolt 25 passes through both of the channel-shaped members 19 and is preferably provided with a spacing sleeve 26 extending between these members, as shown in Fig. 4.

An opening 27 is provided in the fixed support 14, this being the usual tool or battery box opening beneath the seat, and the lower portions of the cushioning elements C respectively extend into this opening adjacent the opposite sides thereof. Two plates 28 are respectively fixed at one end to the inner channel-shaped member 22 and at the other end to the upper surface of the fixed support 14, as shown in Fig. 3.

The seat disclosed in the drawings to illustrate the invention is shown mounted in a vehicle such as an automobile having operating mechanism including the steering wheel 29 adjacent one side thereof, as shown in Fig. 1. In a vehicle of this type, the seat S is almost invariably adjusted by the vehicle operator who sits adjacent the operating mechanism and whose weight is accordingly concentrated on one side of the seat and substantially over one of the slide and guide means 11 and 12. The seat of the present invention is of the type designed to be moved by the operator directly, that is, the operator first releases a locking device to be described hereinafter and then pushes or pulls the seat backward or forward while seated thereon by pushing on the floor with his feet or by pushing or pulling on the steering wheel 29. With this arrangement, it is evident that during operation, the unoccupied side of the seat, that is, the side thereof remote from the operating mechanism including the steering wheel 29, tends to lag behind the occupied side thereof and the seat tends to twist to a diagonal position relative to the fixed support. The binding of the guide and slide mechanism due to such twisting of the seat is eliminated or reduced to a certain extent by the cushioning elements C which permit the slides 12 and 13 to move laterally relative to the fixed support 14 in the plane of movement of the seat and so to accommodate themselves to the twisted or diagonal seat position.

In order to further reduce the binding of the seat upon movement thereof by a non-centrally applied force, it is preferred in accordance with the present invention to provide means for reducing the friction between the guide 5 and the slide 13 at the side of the seat remote from the operator to a value less than the friction between the guide 11 and the slide 12 at the other side of the seat. In the disclosed embodiment of the invention, this is conveniently accomplished by providing a plurality of rotary anti-friction elements such as the rollers 31 between the guide 5 and the slide 13. As shown in Figs. 1, 2 and 3, the rollers are disposed on opposite sides of the slide 13 at spaced points along the guide 5 and are pivotally supported on substantially vertical trunions journaled in the plate 18 and the retaining plates 8. The spacers 7 may be cut away to provide pockets within which the rollers 31 are disposed. The peripheral surfaces of the rollers 31 may be concave as shown in Fig. 3 to fit the convex surfaces of the slide 13.

Suitable releasable locking means are preferably provided for at times preventing the movement of the seat. In the disclosed embodiment, these means include two bars 32, the outer ends of which respectively rest in the openings 10 in the inner spacers 7 of the two guides 5 and 11. A projection or tooth 33 is formed at the outer end of each bar 32 and is designed to fit in locking engagement between the teeth 15 on the corresponding slide 12 or 13 when the bar is in its extended position as shown. The outer ends of the bars 32 may be offset downwardly as shown in Fig. 3 and a tensioned spring 34 is secured over this offset portion between each bar 32 and the corresponding guide plate or block 30. The springs 34 normally maintain the projections 33 on the bars 32 in locking engagement between the teeth 15 on the slides 12 and 13. The inner ends of the bars 32 are pivotally secured to a rotary disk 35 on opposite sides of the axis thereof as shown in Figs. 1 and 2. The disk 35 is pivotally connected to the undersurface of the seat frame 6 by suitable means such as the plate 36. An operating handle 37 is fixed to the disk 35 and extends to a point beneath the front edge of the seat adjacent the operator. It will be evident that by pulling the handle 37 forwardly the disk 35 is turned through a small angle and the bars 32 are accordingly retracted whereby the slides 12 and 13 are released and the seat may be moved forwardly or rearwardly. When the handle 37 is released, the springs 34 pull the bars 32 outwardly and cause the locking engagement of the teeth 33 with the teeth 15, whereby the seat is locked against movement.

Although the invention has been described in connection with a single form of apparatus, it should be understood that various changes may be made in the construction and arrangement of the parts used without departing from the scope of the invention as defined by the appended claims. Thus, the cushioning elements may be attached either to the fixed support as shown or to the seat frame, the slides and guides may be located on the seat or on the support and various anti-friction means other than the disclosed rollers may be used.

I claim:

1. In a device of the character described, two relatively movable members comprising a fixed support and a seat, a pair of spaced substantially parallel guides both extending in a single substantially horizontal plane from front to rear of said seat and fixed to one of said members, a separate slide movably carried in each of said guides, anti-friction means disposed between one only of said guides and its corresponding slide and resilient means interposed in supporting and connecting relationship between each of said slides and the other of said members whereby said two slides may move relative to each other to a limited extent as said slides move in said guides.

2. In a device of the character described, two relatively movable members comprising a fixed support and a seat, a pair of spaced substantially parallel guides both extending in a single substantially horizontal plane from front to rear of said seat and fixed to one of said members, a separate slide movably carried in each of said guides, means for reducing the friction between one of said guides and its corresponding slide to a value less than the friction between the other of said guides and its corresponding slide and non-metallic resilient means interposed in supporting and connecting relationship between each of said slides and the other of said members whereby said two slides may move relative to each other to a limited extent in the plane of movement of said slides in said guides.

3. In a device of the character described, two relatively movable members comprising a fixed support and a seat, a pair of spaced substantially parallel guides both extending in a single substantially horizontal plane from front to rear of said seat and fixed to one of said members, a separate slide movably carried in each of said guides, a plurality of rotary anti-friction elements disposed between one only of said guides and its corresponding slide, and non-metallic resilient means interposed in supporting and connecting relationship between each of said slides and the other of said members whereby said two slides may move relative to each other to a limited extent in the plane of movement of said slides in said guides.

4. In a device of the character described, two relatively movable members comprising a fixed support and a seat, a pair of spaced substantially parallel guides both extending in a single substantially horizontal plane from front to rear of said seat and fixed to one of said members, a separate slide movably carried in each of said guides, means for reducing the friction between one of said guides and its corresponding slide to a value less than the friction between the other of said guides and its corresponding slide, non-metallic resilient means interposed in supporting and connecting relationship between each of said slides and the other of said members whereby said two slides may move relative to each other to a limited extent in the plane of movement of said slides in said guides and means for at times locking said slides against movement in said guides.

5. In a device of the character described, a fixed support, a seat, a pair of spaced substantially parallel guides fixed to said seat and both extending in a single substantially horizontal plane forwardly and rearwardly thereof, a separate slide movably carried in each of said guides, means for reducing the friction between one of said guides and its corresponding slide to a value less than the friction between the other of said guides and its corresponding slide and non-metallic resilient means interposed in supporting and connecting relationship between each of said s'ides and said fixed support whereby said slides may move to a limited extent relative to each other in the plane of movement of said seat.

6. In a device of the character described, a fixed support, a seat, a pair of spaced substantially parallel guides fixed to said seat and both extending in a single substantially horizontal plane forwardly and rearwardly thereof, a separate slide movably carried in each of said guides, anti-friction elements disposed between one only of said guides and its corresponding slide and non-metallic resilient means interposed in supporting and connecting relationship between each of said slides and said fixed support whereby said slides may move to a limited extent relative to each other in the plane of movement of said seat.

7. In a device of the character described, in combination with a vehicle having operating mechanism adjacent one side thereof and a fixed support, a seat extending transversely of said vehicle adjacent and to the rear of said operating mechanism, a pair of substantially parallel guides respectively fixed to said seat adjacent the opposite sides thereof and both extending in a single substantially horizontal plane forwardly and rearwardly of said seat, a separate slide movably carried in each of said guides, a plurality of anti-friction rollers disposed between the guide and the slide on the side of said seat remote from said operating mechanism only, and non-metallic resilient means interposed in supporting and connecting relationship between each of said slides and said fixed support whereby said slides may move to a limited extent relative to each other in the plane of movement of said seat.

8. In a device of the character described, two relatively movable members comprising a fixed support and a seat, a pair of spaced substantially parallel guides both extending in a single substantially horizontal plane from front to rear of said seat and fixed to one of said members, a separate slide movably carried in each of said guides, anti-friction means disposed between one only of said guides and its corresponding slide, resilient means interposed in supporting and connecting relationship between each of said slides and the other of said members whereby said two slides may move relative to each other to a limited extent as said slides move in said guides, a plurality of projections on at least one of said slides and means connected to the member carrying said guides and movable into locking engagement with said projections for at times preventing the movement of said slides in said guides.

9. In a device of the character described, a fixed support, a seat, a pair of spaced substantially parallel guides fixed to said seat and both extending in a single substantially horizontal plane forwardly and rearwardly thereof, a separate slide movably carried in each of said guides, means for reducing the friction between one of said guides and its corresponding slide to a value less than the friction between the other of said guides and its corresponding slide, non-metallic resilient means interposed in supporting and connecting relationship between each of said slides and said fixed support whereby said slides may move to a limited extent relative to each other in the plane of movement of said seat, a plurality of teeth projecting from the inner edge of each of said slides and means connected to said seat and movable into engagement with said teeth for preventing the movement of said slides in said guides.

10. In a device of the character described, two relatively movable members comprising a fixed support and a seat, a pair of spaced substantially parallel guides both extending in a single substantially horizontal plane from front to rear of said seat and fixed to one of said members, a slide movably carried in each of said guides, means for reducing the friction between one of said guides and its corresponding slide to a value less than the friction between the other of said guides and its corresponding slide and means connecting each of said slides to the other of said members.

11. In a device of the character described, in combination with a vehicle having operating mechanism adjacent one side thereof and a fixed support adjacent said operating mechanism, a seat extending transversely of said vehicle adjacent and to the rear of said operating mechanism, a pair of substantially parallel guides respectively fixed to said seat adjacent the opposite sides thereof and both extending in a single substantially horizontal plane forwardly and rearwardly of said seat, a slide movably carried in each of said guides, a plurality of rotary anti-friction elements disposed between the cooperating slide and guide on the side of said seat remote from said operating mechanism only and means for connecting each of said slides to said fixed support.

In testimony whereof I affix my signature.

GERHARD FLINTERMANN.